US009062970B2

(12) United States Patent
Perger et al.

(10) Patent No.: US 9,062,970 B2
(45) Date of Patent: Jun. 23, 2015

(54) BINOCULAR TELESCOPE HAVING AN INTEGRATED LASER RANGE FINDER

(75) Inventors: Andreas Perger, Vienna (AT); Ioannis Kalaitzis, Solms (DE); Ernst Pobenberger, Weigelsdorf (AT)

(73) Assignees: LEICA CAMERA AG, Solms (DE); Andreas Perger, Vienna (AT)

( * ) Notice: Subject to any disclaimer, the term of this patent is extended or adjusted under 35 U.S.C. 154(b) by 0 days.

(21) Appl. No.: 14/113,454

(22) PCT Filed: Apr. 22, 2012

(86) PCT No.: PCT/DE2012/100113
§ 371 (c)(1),
(2), (4) Date: Oct. 23, 2013

(87) PCT Pub. No.: WO2012/146239
PCT Pub. Date: Nov. 1, 2012

(65) Prior Publication Data
US 2014/0176934 A1 Jun. 26, 2014

(30) Foreign Application Priority Data

Apr. 25, 2011 (DE) .................... 20 2011 005 580 U
Apr. 13, 2012 (DE) ........................ 10 2012 007 464

(51) Int. Cl.
*G01C 3/04* (2006.01)
*G01S 7/481* (2006.01)
*G02B 23/18* (2006.01)
*G02B 7/12* (2006.01)

(52) U.S. Cl.
CPC . *G01C 3/04* (2013.01); *G01S 7/481* (2013.01); *G02B 23/18* (2013.01); *G02B 7/12* (2013.01)

(58) Field of Classification Search
CPC .............. G01C 3/00; G01C 3/02; G01C 3/04; G01C 3/08; G02B 23/16; G02B 23/18

USPC ............ 356/3.01–3.15, 4.01–4.1, 5.01–5.15, 356/9–22, 28, 28.5
See application file for complete search history.

(56) References Cited

U.S. PATENT DOCUMENTS

| 6,266,185 | B1 | 7/2001 | Miller et al. |
| 7,271,954 | B2 | 9/2007 | Perger et al. |
| 2005/0128576 | A1* | 6/2005 | Perger et al. .................. 359/412 |
| 2009/0303457 | A1 | 12/2009 | Lancaster et al. |

FOREIGN PATENT DOCUMENTS

DE 10 2004 054 182 B4 8/2007
EP 0 961 147 A1 12/1999

OTHER PUBLICATIONS

IB of WIPO, International Preliminary Report on Patentability and Written Opinion, PCT/DE2012/100113, 9 pages.

* cited by examiner

*Primary Examiner* — Luke Ratcliffe
(74) *Attorney, Agent, or Firm* — Foley & Lardner LLP

(57) ABSTRACT

A binocular telescope with an integrated laser rangefinder includes spatially separate first and second telescope tubes, each with an eyepiece and a focusable lens, that are connected by a folding bridge for setting eye spacing. The folding bridge has an eyepiece-side hinge body with first and second hinge eyes, and a spatially separate lens-side hinge body. The hinge eyes are connected to the telescope tubes. A rotary knob is mounted on a hinge shaft for focusing the lenses, which are arranged in the telescope tubes. A receiver of the laser rangefinder and an optoelectronic display element are disposed in the first telescope tube. A transmitter of the laser rangefinder is arranged on the lens-side hinge body, is flush with the hinge shaft, and emits a transmission beam parallel to an observation direction. The lens-side hinge body has first and second brackets.

12 Claims, 4 Drawing Sheets

BINOCULAR TELESCOPE HAVING AN INTEGRATED LASER RANGE FINDER

The invention relates to a binocular telescope with an integrated laser rangefinder.

DE 10 2004 054 182 B4 has disclosed such a telescope. It consists of separate first and second telescope tubes, each with an eyepiece and a lens that can be focused. The telescope tubes are connected to one another by a folding bridge for setting the eye spacing. The folding bridge contains eyepiece-side and lens-side hinge elements. The eyepiece-side hinge elements consist of hinge eyes, which are each connected to the first and the second telescope tube and into which a hinge shaft has been inserted. A rotary knob for focusing the lenses arranged in the telescope tubes is mounted on the hinge shaft.

The receiver of a laser rangefinder and an optoelectronic display element are also arranged in the first telescope tube in a fixed arrangement with respect to the optical observation axis of the first telescope tube. With the transmission axis thereof, the transmitter of the laser rangefinder is arranged parallel to the optical observation axis of the first telescope tube and flush with the hinge shaft of the eyepiece-side hinge element on part of the lens-side hinge element, connected to the first telescope tube.

The lens-side hinge element consists of two brackets which lie on top of one another in the axial direction, are attached in each case to the two telescope tubes and have a central bore, into which a cylindrical sleeve part has been inserted as centering element. The cylindrical sleeve part is fixedly connected to the bracket that is attached in the first telescope tube. The sleeve part serves for holding the transmitter of the laser rangefinder.

The eyepiece-side and the lens-side hinge element are covered by an overarching housing shell. Additional electronic measuring devices, a battery compartment and actuation pushbuttons are arranged in the second telescope tube. The connection lines to the laser rangefinder and display element are arranged in the region of the folding bridge covered by the housing shell, between the eyepiece-side and the lens-side hinge elements. The connection lines can also be laid tightly adjacent to the hinge elements, from the electronic components arranged in the vicinity thereof to the electronic components arranged in the other telescope tube, wherein the respective hinge elements can be provided with a separate cover. A restricted free passage between the telescope tubes can then be created between the eyepiece-side and the lens-side hinge elements.

EP 0 961 147 A1 has disclosed a binocular telescope, in which the eyepiece-side and the lens-side hinge element are embodied as separate bridge bodies, between which there is an extended passage. The two bridge bodies are provided with hinge shafts flush with one another. No provision is made for a laser rangefinder.

The invention is based on the object of developing the known binocular telescope with integrated laser rangefinder and folding bridge such that provision can be made for a free passage between the hinge elements for the fingers of the user so as to improve the handling of the telescope.

According to the invention, this object is achieved by virtue of all electronic and optoelectronic components of the field glasses being arranged together within only one telescope tube and/or on attachment parts fixedly connected to this telescope tube. The elements arranged outside of the telescope tube are, in principle, selected according to the communication thereof with the elements arranged within the telescope tube only requiring signal lines provided with insulation, which can be inserted or cemented in an air-tight manner in the transition points to the telescope tube. This simplifies the conventional, permanent filling of the telescope tube with an inert gas such as e.g. nitrogen. Moreover, bending and tensioning of the signal lines when setting the eye spacing, which could lead to clamping of or damage to the signal lines, are avoided. Since the signal lines are only arranged between mechanical components that are stationary with respect to one another, the signal lines can be laid in a short and direct manner. On the eyepiece side and on the lens side, the hinge elements can be formed as bridge-forming hinge bodies between the telescope tubes. As a result, there are no lines outside of a sealed housing.

As a result of the possible short line paths, the arrangement of all electronic components within only one contiguous tube housing (telescope tube with hinge element formed thereon) and the embodiment of the tube housing as a metal body, electronic emissions and the interference sensitivity in relation to external emitters are very low.

A substantial improvement compared to the known design of the lens-side hinge element consists of the first bracket arranged on the telescope tube with integrated laser rangefinder is arranged following the second bracket connected to the other telescope tube in the observation direction. At their free ends, the brackets can be provided with cylindrical cups, wherein the cup on the second bracket is inserted such that it can swivel in the cup on the first bracket. A recess corresponding to the folding region around the hinge shaft in the eyepiece-side hinge element is present in the sidewall of the outer cup.

On the cup bases, the two brackets can be screwed to one another in such a way that the folding region defined by the hinge shaft is not impeded. During the screwing together, a spring plate which tensions the two brackets in the axial direction can be inserted between the cup bases. As a result, the folding bridge obtains good twist rigidity over the whole length of the telescope tubes and this is also ensured in any folding position as a result of the cylindrical cups inserted into one another.

A housing, which is open on the lens side, delimited from the telescope tube and can be sealed by a front plate, can be formed onto the bracket connected to the first telescope tube. The transmitter of the laser rangefinder, at least one deflection mirror for aligning the transmission axis and a transmission lens for collimating the transmission beam can be arranged on the front plate. This enables an adjustment of the transmission beam perpendicular to the plane of the front plate before assembling the front plate on the housing. Only a low installation height on the front plate is required for the arrangement of the transmission beam path with mirror deflection. The transmission lens can be adjustable along three axes for collimating and aligning the transmission axis parallel to the observation direction of the associated telescope tube.

As a result of the laser transmitter arranged on the front side and the beam guidance with low installation height substantially parallel to the front plate, the attachment of the lens-side hinge element can, overall, be displaced very far to the front, delimited by the lens tubes. As a result, the area available for the fingers to pass through between the eyepiece-side and the lens-side hinge elements is substantially increased.

Expediently, a plug-in compartment that can be sealed can be formed into the housing on the lower side in the usage position of the telescope. The plug-in compartment can preferably be equipped with contacts for connecting a battery. Additionally, the plug-in compartment can also be equipped with contacts for connecting interchangeable memory cards and/or an interface for data transmission by wires or for wireless data transmission.

One or more switches or pushbuttons for actuating the laser rangefinder and/or the menu control of the display element can be arranged on the top side, in the usage position, of the part of the eyepiece-side hinge element associated with the first telescope tube. The switches or pushbuttons are then in a position expedient in relation to the grip when the telescope is held in front of the eyes of the user.

In a manner known per se, pressure, temperature, inclination, humidity and/or direction sensors can be associated with the laser rangefinder within the first telescope tube such that, with the aid of a likewise installed computing unit, different evaluations of the range finding and ballistic calculations of the trajectory of a projectile can be generated, taking into account the distance, inclination, air pressure and air humidity, together with a graphical display on the display element.

The pressure, humidity and/or temperature sensors are expediently attached in an outer housing region of the first telescope tube in order to avoid measurement errors due to a gas filling, under positive pressure, of the interior of the telescope tube. These sensors are preferably inserted into an outer attachment-area area of the eyepiece tube attached to the first telescope tube such that they lie outside of possible hand rest regions of the user on the telescope tube.

User-specific projectile data, such as bore, weight, BC value, projectile speed, etc., can also be entered individually via the provided interface in order to enable a precise trajectory calculation.

The drawing schematically depicts an exemplary embodiment of the telescope according to the invention, which is described in more detail below on the basis of the figures. Here:

Figure 1:
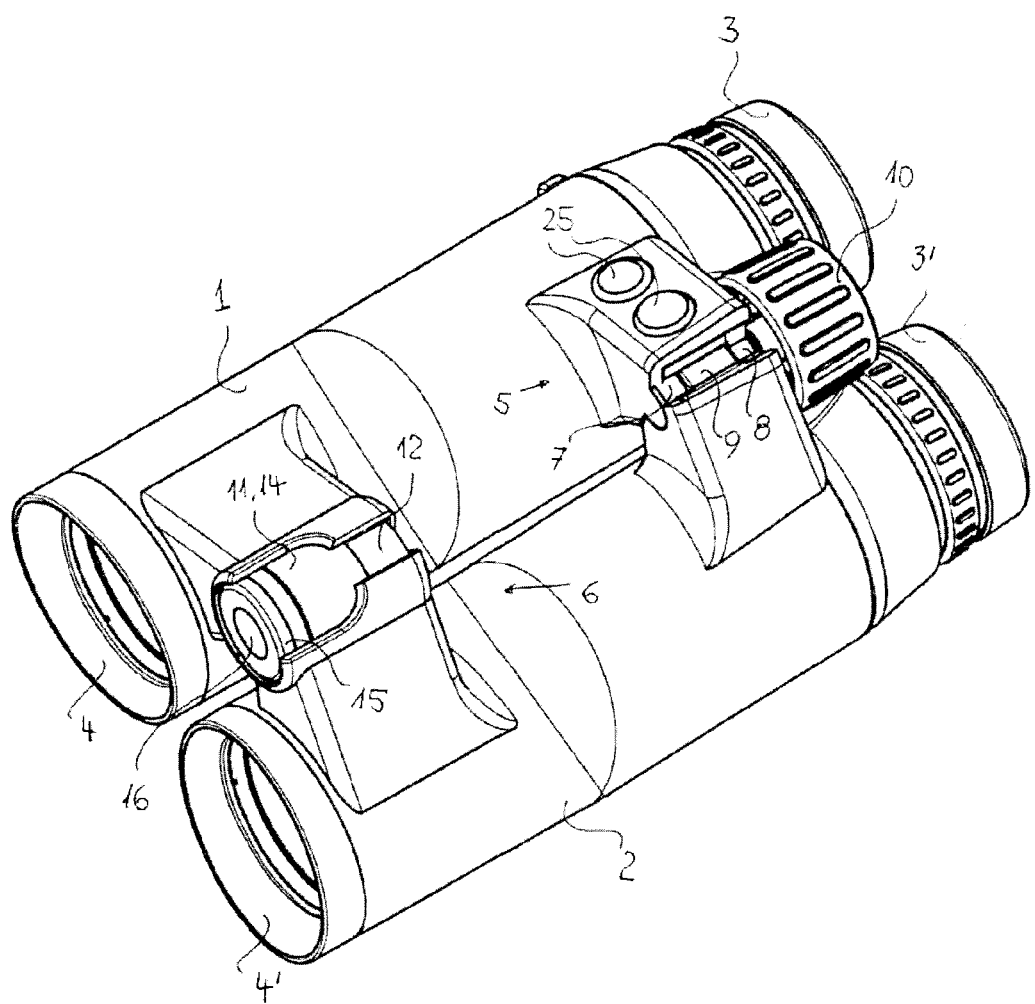
FIG. 1 shows an oblique view.

The oblique view depicted in FIG. 1 shows the side of the binocular telescope at the top in the usage position. A first telescope tube 1 and a second telescope tube 2 are folded against one another by a folding bridge arranged on the telescope tubes 1, 2. In order to set the eye spacing of a user, the telescope tubes 1, 2 can be folded apart. In the process, a free passage for the fingers of the user is created between the telescope tubes 1, 2 and the bodies of the folding bridge. The telescope tubes 1, 2 contain an eyepiece 3, 3' and a lens 4, 4' that can be focused.

The folding bridge consists of an eyepiece-side hinge body 5 and a separate lens-side hinge body 6. The eyepiece-side hinge body 5 contains a first hinge eye 7 formed onto the first telescope tube 1 and a second hinge eye 8 formed onto the second telescope tube 2. A hinge shaft 9 which is securely screwed to the hinge eye 7 is inserted into the two hinge eyes 7, 8. A rotary knob 10 is placed in a rotatable manner onto the hinge shaft 9. The rotary knob 10 cooperates in a manner known per se, through the hinge body 5, with the lenses 4, 4' for focusing.

It can be gathered from the top view that the hinge body 5 has a break in the region of the hinge shaft 9 and the hinge body 6 has a break flush therewith, which restrict the pivot region for the necessary eye-spacing setting. The hinge bodies 5, 6 which are placed on the telescope tubes 1, 2 and in each case divided into two however form pivot arms which ensure sufficient free space for the fingers to pass through between the pivoted-out telescope tubes 1, 2.

The receiver of a laser rangefinder and an optoelectronic display element are arranged in a manner known per se within the first telescope tube 1. Through the lens 4, the receiver measures the light, reflected at the observed object, from the laser transmitter yet to be described below. The display element can be observed through the eyepiece 3. Switches and/or pushbuttons 25 for triggering and/or displaying the functions of the laser rangefinder are arranged on the part of the hinge body 5 connected to the first telescope tube 1.

Figure 2:
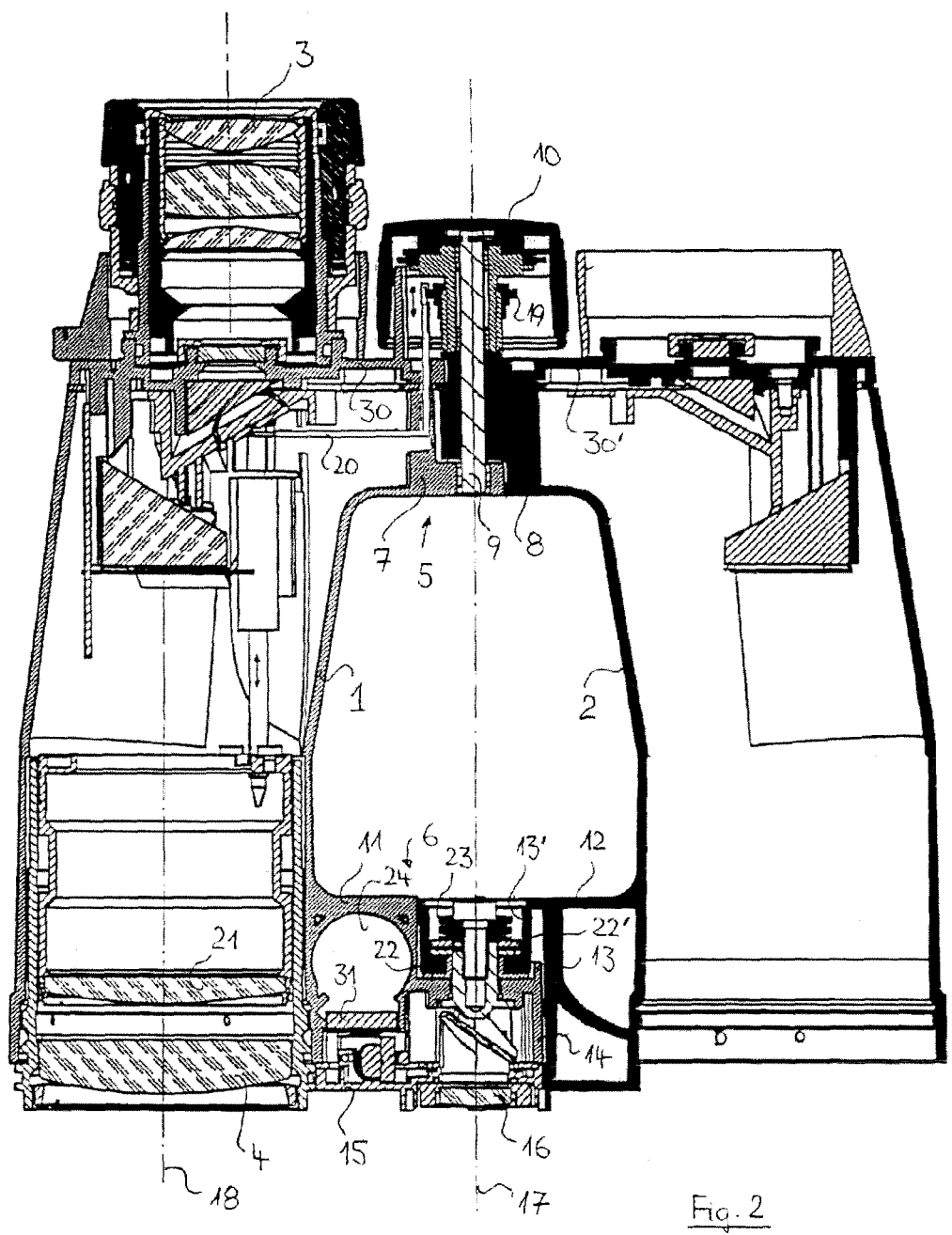
FIG. 2 shows a sectional illustration.

The lens-side hinge body 6 consists of a first bracket 11 formed on the first telescope tube 1 and a second bracket 12 formed on the second telescope tube 2. The first bracket 11 and the second bracket 12 are extended by cylindrical cups 13, 13' (not illustrated in any more detail here), which are inserted into one another and screwed such that they can swivel with respect to one another (FIG. 2). An open housing 14 which points in the direction of the lenses 4, 4' and can be sealed by a front plate 15 is additionally attached to the first bracket 11. Arranged on the front plate 15 is the transmitter of the laser rangefinder, the measurement radiation of which is emitted from the hinge body 6 via a transmission lens 16. The transmission axis of the transmission lens 16 is flush with the hinge shaft 9. In order to align the transmission axis to the axis direction predetermined by the hinge shaft 9, the transmission lens is mounted adjustable in the x/y direction.

As a result of the hinge bodies 5, 6 placed onto the telescope tubes 1, 2, the axis formed by the transmission axis and the hinge shaft 9 lies slightly above and parallel to the plane formed by the observation axes of the telescope tubes 1, 2.

The sectional plane depicted in FIG. 2 is selected at an angle to the plane spanned by the observation axes of the telescope tubes 1, 2 such that the folding-bridge axis 17 with the transmission axis of the transmission lens 16 and the observation axis 18 of the lens 4 in the first telescope tube 1 lie in the sectional plane. The components still shown in the telescope tube 2 cannot be depicted in a mirror-symmetric manner to the components in the telescope tube 1 since they lie in a different sectional plane. The two telescope tubes 1, 2 are folded apart such that a free space for the fingers to pass through emerges between the eyepiece-side hinge body 5 and the lens-side hinge body 6. The free space is extended further by an offset of the optical axes of the lens 4 and the eyepiece 3. The axis offset is created in a manner known per se by an image erecting prism (not depicted in any more detail) between lens 4 and eyepiece 3.

It can be gathered from the sectional illustration that the hinge shaft 9 is screwed into the eyepiece-side first hinge eye 7. The second hinge eye 8 is rotatably mounted on the hinge shaft 9. The alignment of the bores in the hinge eyes 7, 8 and the fit thereof with the hinge shaft 9 have to be very precise in order to ensure parallel pivoting of the observation axes of the lenses 4, 4' when setting the eye spacing.

The rotary knob 10 is likewise mounted in a rotatable manner on the hinge shaft 9. A spindle nut 19 is mounted in a height adjustable manner within the rotary knob 10. (Arrow). The spindle nut 19 actuates a gear 20, which adjusts a focusing member 21 in the lens 4. An equivalent transmission means is present in the telescope tube 2.

On the front side, the focusing member 21 is held in an elongate holding sleeve, which is mounted in a sliding manner in a holding sleeve of the lens 4 matched thereto. This causes a centered displacement, secured against tilting, of the focusing member 21 in relation to lens 4.

The brackets 11, 12 formed onto the telescope tubes 1, 2 on the lens side have cylindrical cups 13, 13', which, from the passage space, are inserted into one another in a rotatable manner. Via the cup bases 22, 22', the brackets 11, 12 are screwed such that they can rotate in relation to one another by virtue of inserting a cup spring 23. Here, small fit tolerances are permitted in order to avoid tensioning in relation to the swivel axis defined by the hinge shaft 9. The cylindrical cups 13, 13' impart good rigidity against twisting to the hinge body 6.

The housing 14 that terminates on the front side with the front plate 15 is formed onto the first bracket 11. A plug-in compartment 24, which is open toward the lower side of the hinge body 6 for inserting a battery and/or further components (FIG. 3), is also part of the housing 14.

In order to connect the two telescope tubes 1, 2 to the folding bridge, the cylindrical cups 13, 13' are inserted into one another, the hinge eyes 7, 8 are positioned over one another and the latter are aligned in relation to one another by insertion of and screwing-in the hinge shaft 9. Screwing the cup bases 22, 22' should be set up such that free moving swiveling is possible when a friction force for fixing a set eye spacing is overcome.

On the eyepiece side, the two telescope tubes 1, 2 are terminated by attachment areas 30, 30' for the eyepieces 3, 3' such that it is possible to fill the tubes with an inert gas. Additional sensors for measuring external physical parameters can be inserted into the attachment areas 30, 30'. Such sensors with miniaturized embodiments are known from other electronic instruments.

Figure 3:
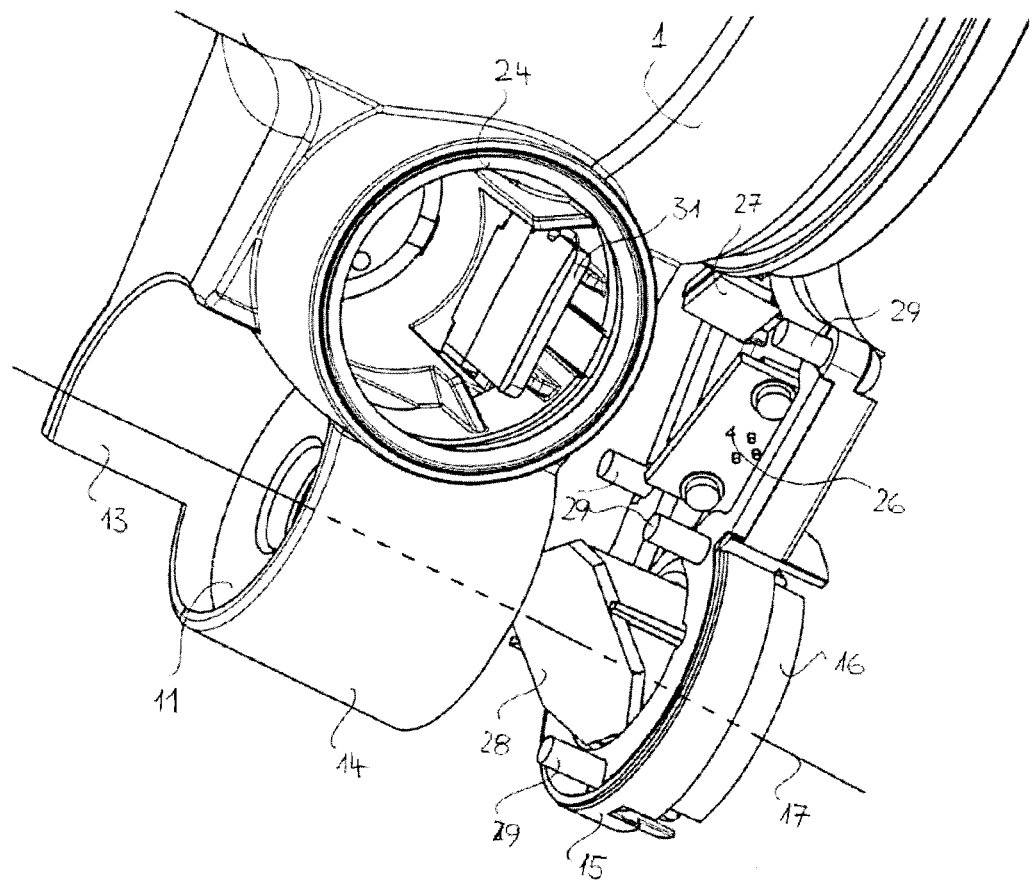
FIG. 3 shows an oblique view on the lens side from below.

FIG. 3 shows an oblique view from below of the first bracket 11, formed onto the first telescope tube 1, with the cylindrical cup 13, the plug-in compartment 24, the housing 14 and the front plate 15. A battery (not illustrated) can be inserted into the plug-in compartment 24. Moreover, it is also possible to plug in a memory card 31. By means of contacts and signal lines (not depicted in any more detail), an electric connection is established in a manner known per se between the battery and the memory card 31 and the electronic components arranged in the first telescope tube 1. An interface for entering data can be associated with the memory card 31.

On the front plate 15, a laser transmitter 26 is arranged in an adjustable manner on an assembly plate. The radiation from the laser transmitter 26 is directed to a first deflection mirror 27 and a second deflection mirror 28. The second deflection mirror 28 serves to align the laser radiation perpendicular to the plane of the front plate 15 along the transmission axis 17 through the transmission lens 16. The focus of the transmission lens 16 lies on the laser transmitter 26, and so the transmission lens 16 generates a collimated laser beam bundle. After external adjustment of the optical components, the front plate 15 is inserted in a predetermined position into the housing 14 using pins 29. Electrical lines for supplying the laser transmitter 26 are guided into the first telescope tube 1 with the remaining connection lines via the plug-in compartment 24.

Figure 4:
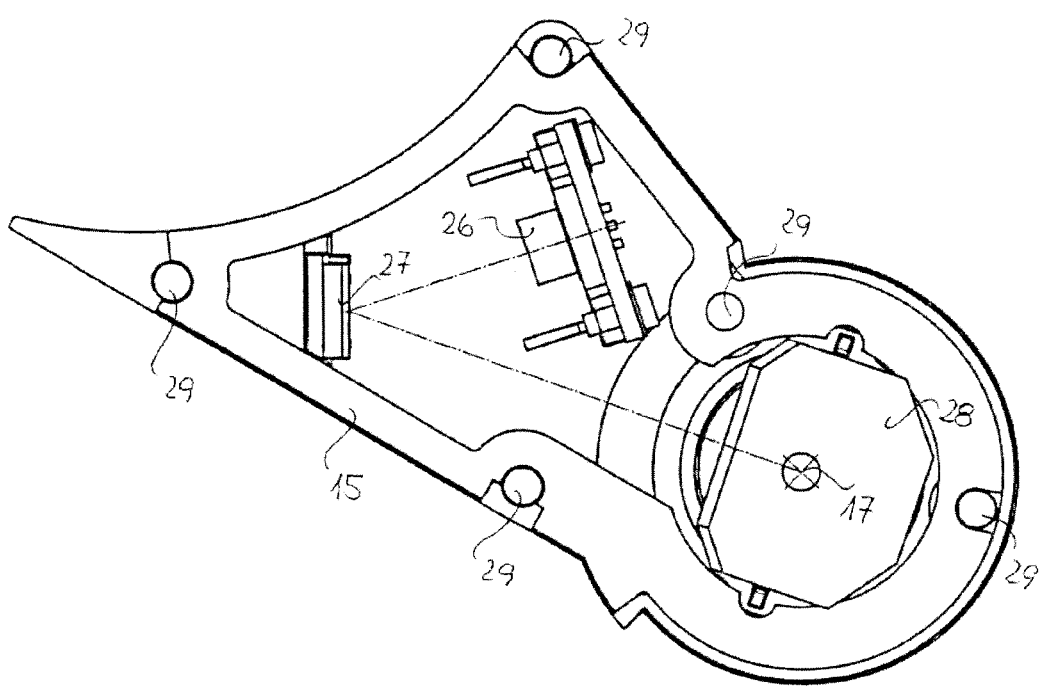
FIG. 4 shows a top view of the inner face of the front plate.

The beam path from the laser transmitter 26 to the deflection mirrors 27, 28 and perpendicular to the plane of the drawing can be gathered from the top view in FIG. 4.

LIST OF REFERENCE SIGNS

1 First telescope tube
2 Second telescope tube
3, 3' Eyepiece
4, 4' Lens
5 Eyepiece-side hinge body
6 Lens-side hinge body
7 First hinge eye
8 Second hinge eye
9 Hinge shaft
10 Rotary knob
11 First bracket
12 Second bracket
13, 13' Cylindrical cup
14 Housing
15 Front plate
16 Transmission lens
17 Transmission axis
18 Observation axis
19 Spindle nut
20 Gear
21 Focusing member
22, 22' Cup base
23 Cup spring
24 Plug-in compartment
25 Switch/pushbutton
26 Laser transmitter
27 First deflection mirror
28 Second deflection mirror
29 Pin
30, 30' Attachment area
31 Memory card

The invention claimed is:

1. A binocular telescope with an integrated laser rangefinder, comprising:
    spatially separate first and second telescope tubes each with an eyepiece and a focusable lens,
    wherein the telescope tubes are connected to one another by a folding bridge for setting eye spacing,
    wherein the folding bridge includes an eyepiece-side hinge body and a spatially separate lens-side hinge body,
    wherein the eyepiece-side hinge body includes a first hinge eye connected to the first telescope tube and a second hinge eye connected to the second telescope tube, which are connected to one another by a hinge shaft, on which a rotary knob is mounted for focusing the lenses, which are arranged in the telescope tubes,
    wherein a receiver of the laser rangefinder and an optoelectronic display element are disposed in the first telescope tube in a fixed arrangement with respect to an optical observation axis of the first telescope tub, and
    with a transmission axis thereof, a transmitter of the laser rangefinder is arranged on the lens-side hinge body and flush with the hinge shaft of the eyepiece-side hinge body, the transmitter being structured to emit a transmission beam parallel to an observation direction of the first telescope tube,
    wherein the lens-side hinge body has first and second brackets, which are each connected to the first and second telescope tubes respectively and screwed to one another under an axially acting spring force so as to be rotatable in opposite directions about an axis flush with the hinge shaft of the eyepiece-side hinge body, and
    wherein the first bracket is connected to the first telescope tube and is arranged downstream of the second bracket, which is connected to the second telescope tube, in the observation direction and the transmitter of the laser rangefinder is arranged on the first bracket.

2. The telescope as claimed in claim 1, wherein a housing, which is open in the observation direction, arranged with a telescope tube, and sealable by a front plate, is formed on the first bracket.

3. The telescope as claimed in claim 2, wherein the transmitter of the laser rangefinder, at least one deflection mirror for aligning the transmission axis, and a transmission lens for collimating the transmission beam are arranged on the front plate.

4. The telescope as claimed in claim 3, wherein the transmission lens is adjustable along two axes.

5. The telescope as claimed in claim 2, wherein a plug-in compartment configured to be sealed is formed into the housing on a lower side in a usage position of the telescope.

6. The telescope as claimed in claim 5, wherein the plug-in compartment is equipped with contacts for connecting a battery.

7. The telescope as claimed in claim 6, wherein the plug-in compartment is additionally equipped with contacts for connecting an interchangeable memory card and/or an interface for wireless data transmission.

8. The telescope as claimed in claim 1, wherein one or more switches and/or pushbuttons for actuating the laser rangefinder and displays of the display element are arranged on a top side, in a usage position, of part of the eyepiece-side hinge body, which is associated with the first telescope tube.

9. The telescope as claimed in claim 1, wherein pressure, temperature, inclination, humidity and/or direction sensors are assigned to the laser rangefinder in the first telescope tube.

10. The telescope as claimed in claim 9, wherein the temperature, humidity and/or pressure sensors are disposed in an outer housing area of the first telescope tube.

11. The telescope as claimed in claim 10, wherein the sensors are installed in an outer attachment area of the eyepiece of the first telescope tube.

12. The telescope as claimed in claim 1, wherein the transmitter is offset from the transmission axis.

* * * * *